United States Patent [19]
Moses et al.

[11] Patent Number: 5,319,039
[45] Date of Patent: Jun. 7, 1994

[54] THERMALLY PROCESSABLE BLENDS OF AROMATIC POLYESTERS AND HIGH MODULUS POLYURETHANES

[75] Inventors: Paul J. Moses, Midland, Mich.; Augustin T. Chen, Cheshire, Conn.

[73] Assignee: The Dow Chemical Company, Midland, Mich.

[21] Appl. No.: 876,652

[22] Filed: Apr. 30, 1992

[51] Int. Cl.$^5$ .............................................. C08L 75/04
[52] U.S. Cl. .................................. 525/424; 525/440; 525/454; 525/932
[58] Field of Search ............... 524/539, 605; 525/454, 525/932, 425, 424, 440

[56] References Cited

U.S. PATENT DOCUMENTS

| | | | |
|---|---|---|---|
| 4,034,016 | 7/1977 | Baron et al. | 525/440 |
| 4,048,253 | 9/1977 | Ooba et al. | 524/440 |
| 4,179,479 | 12/1979 | Carter, Jr. | 525/66 |
| 4,279,801 | 7/1981 | Kramer et al. | 524/539 |
| 4,448,936 | 5/1984 | Wang et al. | 525/424 |
| 4,784,123 | 11/1988 | Robeson | 602/8 |

FOREIGN PATENT DOCUMENTS

| | | |
|---|---|---|
| 0334186 | 9/1989 | European Pat. Off. . |
| 2065289 | 5/1973 | Fed. Rep. of Germany . |
| 2350852 | 4/1975 | Fed. Rep. of Germany . |

*Primary Examiner*—Paul R. Michl
*Assistant Examiner*—Tae H. Yoon

[57] ABSTRACT

The tensile strength of a thermoplastic, transparent, aromatic polyester is markedly improved by incorporating into the polyester a thermoplastic, rigid polyurethane. The resultant transparent blend is particularly useful in making eyeglasses, toothbrushes, and screwdriver handles.

7 Claims, No Drawings

THERMALLY PROCESSABLE BLENDS OF AROMATIC POLYESTERS AND HIGH MODULUS POLYURETHANES

BACKGROUND OF THE INVENTION

This invention relates to synthetic polymeric resin compositions useful for thermoplastic fabrication. More particularly, the present invention refers to thermoplastic blends of polyesters and other polymers that improve certain physical properties without adversely affecting the transparency property of the polyester.

The high molecular weight polyesters of terephthalic, isophthalic and other aromatic diacids are well known. See, for example, U. S. Pat. Nos. 2,465,319 and 3,047,539. These aromatic polyesters have many properties such as high heat distortion temperature, stiffness, transparency and the like which make them particularly suitable for use in containers, electronic components and consumer products. However, for many potential applications such as safety eyeglasses, the polyesters do not possess sufficient combination of tensile strength, toughness and transparency to perform satisfactorily.

Therefore, it is highly desirable to provide a means to improve the tensile strength of the polyester without sacrificing its hardness, thermal resistance or transparency.

SUMMARY OF THE INVENTION

In a first aspect, the present invention is a transparent, thermally processable polyester/polyurethane blend exhibiting improved tensile strength. This blend comprises (1) a thermoplastic, aromatic polyester and (2) a thermally processable, rigid polyurethane in an amount sufficient to measurably increase the tensile strength of the polyester without significantly reducing the transparency of the polyester.

Surprisingly, the blends of the present invention exhibit excellent tensile strength and a toughness, thermal resistance or hardness which is at least equal to such properties of the polyester and a transparency which is comparable to the transparency of the polyester. As a result of their unique combination of properties, these blends are useful in safety eyeglasses; industrial components, such as sight glasses, protective covers; fuel handling systems; consumer products including screwdriver handles, toothbrushes, and other applications requiring transparency and heat resistance and tensile strength.

DETAILED DESCRIPTION OF THE INVENTION

Aromatic Polyester

The aromatic polyester employed in the practice of this invention is preferably any thermoplastic, transparent polyester prepared by reacting an aromatic diacid such as terephthalic acid or isophthalic acid with an alkylene diol such as ethylene glycol, 1,3-propanediol or 1,4-butanediol. Also suitable are the various copolyesters prepared from mixtures of aromatic diacids and/or mixtures of alkylene diols. The polyesters may be essentially linear or branched as a result of using branching agents such as tri- and tetracarboxylic acids. The polyesters may be capped with different diols such as cyclohexane-dimethanol and cyclohexanediol.

In general, suitable polyesters and copolyesters can be prepared from one or more multi-hydric compounds (including derivatives thereof such as metal phenolates of diphenols) by reacting multi-hydric compound(s) such as a dihydric phenol with a polyester precursor such as an aromatic dicarboxylic acid or its acid chlorides. See for example the Encyclopedia of Polymer Science and Engineering, Vol. 12, "Polyesters", p. 1 et. seq. (1987) and *High Performance Polymers: Their Origin and Development*, "History of Polyarylates", pp. 95 to 103 (1986). Melt, solution and interfacial processes for the preparation of these polyesters and copolyesters are known and can be suitably employed. See for example, U.S. Pat. Nos. 2,465,319; 3,047,539; 3,216,970; 3,756,986; 3,946,091; 4,049,629 and 4,137,278, all of which are incorporated herein by reference. In particular, U.S. Pat. Nos. 4,137,278 and 3,946,091 disclose melt polymerization techniques; U.S. Pat. Nos. 4,049,629 and 3,946,091 disclose solution polymerization techniques; and U.S. Pat. Nos. 3,946,091 and 3,216,970 disclose interfacial polymerization techniques, which techniques could preferably be employed to prepare polyester resins. Other suitable polyesters and methods for preparing them are described in U.S. Pat. No. 4,279,801.

Examples of suitable polyester precursors include the following acids or their corresponding acid chlorides: terephthalic acid, isophthalic acid, naphthalenedicarboxylic acid, diphenyletherdicarboxylic acid, diphenyldicarboxylic acid, diphenylsulfone-dicarboxylic acid, diphenoxyethanedicarboxylic acid, and the like. Examples of suitable multi-hydric compounds include aliphatic diols such as ethylene glycol, 1,3-propanediol, 1,4-butanediol, 1,5-pentanediol, 1,6-hexanediol, cyclohexane dimethanol; and dihydric phenols such as bisphenol and bisphenol A.

A preferred aromatic polyester is represented by repeated units corresponding to the general formula:

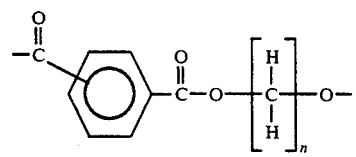

I wherein n is selected from the numbers 2 through 6. Of the foregoing polyesters, the poly(ethylene terephthalate) and poly(1,4-butylene terephthalate) polyesters and their copolyesters are more preferred, with the poly(ethylene terephthalates) polyester and copolyester being most preferred.

Polyurethane

The polyurethane employed in the practice of this invention is a rigid thermoplastic polyurethane (herein also referred to as RTPU). Further, this polyurethane is thermally processable, i.e., it exhibits the character of heat plastification upon heating to a temperature of 200° C. to 270° C. and can be extruded, injection molded or otherwise fabricated in the same manner as any other thermoplastic polymer. By "rigid thermoplastic polyurethane" is meant a thermoplastic polyurethane having a tensile modulus of at least 150,000 pounds per square inch (psi) (1,034 MPa) (as determined by ASTM D-638). These rigid thermoplastic polyurethanes are characterized by having at least 80 weight percent of the polyurethane, more preferably at least 90 weight percent and most preferably 95 weight percent of hard segments. By "hard segment" is meant a rigid thermoplastic polyurethane having a glass transition temperature (Tg as determined by ASTM D-746-52T) of at least 60° C. or higher. More preferably this hard segment has a glass transition temperature ) of at least 80° C., most preferably at least 90° C.

Of particular interest are the polyurethanes which present transparency of greater than 80 percent when measured according to ASTM D1003 and are prepared from an organic diisocyanate, a difunctional active hydrogen extender having a molecular weight of less than 200 at least a part of which could optionally a diol, diamine or comparable difunctional active hydrogen compound having a cycloalkanedialkylene or a cycloalkylene moiety (herein such difunctional active hydrogen compounds shall be collectively referred to as a cyclic diahl) and an optional polyahl which can have a functionality greater than 2. The term "ahl" means an active hydrogen moiety capable of reacting with an isocyanate group to form a urethane, urea, thiourea or corresponding linkage depending on the particular active hydrogen moiety being reacted. Examples of such preferred polyurethanes are the thermoplastic and similarly extrudable polyurethanes described in U.S. Pat. No. 4,822,827, which is hereby incorporated by reference in its entirety.

Organic diisocyanates which may be employed to make the polyurethane include aromatic, aliphatic and cycloaliphatic diisocyanates and combinations thereof. Representatives of these types are m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, diphenylmethane-4,4'-diisocyanate, 4,4'-biphenylene diisocyanate and other diisocyanates disclosed in U.S. Pat. No. 4,731,416. Due to their availability and properties, the aromatic diisocyanates such as tolylene diisocyanate, 4,4'-methyldiphenyl diisocyanate and polymethylene polyphenylisocyanate are preferred, with diphenylmethane-4,4'-diisocyanate and liquid forms based thereon being most preferred. Also suitable are isocyanate-terminated prepolymers such as those prepared by reacting polyisocyanates with polyols; however, the amount of polyol should be limited so that the Tg of the polyurethane is not reduced below 60° C.

In a preferred embodiment, the cyclic diahl is employed in an amount sufficient to impart the required Tg for the hard segment. The cyclic diahl component may be a diahl or a mixture of more than one diahl. The cyclic ring may be substituted by inert groups in addition to the two active hydrogen moieties or alkylene active hydrogen moieties. By "inert group" is meant any group that does not react with an isocyanate group or active hydrogen group such as hydroxyl or amino or does not otherwise interfere the polyurethane or polyurea reaction Examples of inert groups are $C_1$ to $C_8$ alkyls, nitro, $C_1$ to $C_8$ alkoxy, halo, cyano and the like. Illustrative cycloalkane diols include 1,3-cyclobutanediol, 1,3-cyclopentanediol, 1,2-cyclohexanediol, 1,3-cyclohexanediol, 1,4-cyclolohexanediol, 2-methyl-1,4-cyclohexanediol, 4,4'-methylene bis(cyclohexanol) and 4,4-isopropylidenebis(cyclohexanol) and other cycloalkanediols listed in U.S. Pat. No. 4,822,827. Illustrative of the cycloalkane dialkanols include cyclohexane dimethanol. Of the cycloalkanediols and cycloalkane dialkanols (also called bis(hydroxyalkyl)cycloalkanes), the cyclohexanediols cyclohexane dimethanol and 4,4'-alkylidenebis-(cyclohexanols) are more preferred, with 1,4-cyclohexane dimethanol being most preferred. Also suitable as cyclic diahls are the corresponding diamines, dithiols and diamides of cycloalkanes and dialkylcycloalkanes.

In addition to the cyclic diahls, other chain extenders are optionally employed in making the polyurethane provided that such chain extenders are used in amounts which do not reduce the glass transition temperature of the polyurethane below 60° C. Illustrative of such extenders are aliphatic straight and branched chain diols having from about 2 to 10 carbons in the chain, including, aliphatic diamines such as ethylenediamine and diethylenetriamine, and aromatic diamines such as diethyltoluenediamine. Exemplary diols, which are preferred as the other extender, include ethylene glycol, 1,3-propanediol, 1,4-butanediol, 1,5-pentanediol, 1,6-hexanediol, 1,2-propanediol, 1,3- and 2,3-butanediol, and mixtures of two or more of such diols as further described in U.S. Pat. No. 4,822,827. Most preferred as such other extenders are 1,4-butanediol and 1,6-hexanediol. Trifunctional extenders such as glycerol, trimethylolpropane and the like can also be employed in small amounts, i.e., less than 5 weight percent, in admixture with one or more of the afore-mentioned chain extenders. Larger amounts of the trifunctional extenders should be avoided in order to retain the desired thermal processability. Of the other extenders, it is more preferred to use 1,4-butanediol, 1,6-hexanediol, neopentyl glycol, ethylene glycol and diethylene glycol, either alone or in admixture with one or more of the named aliphatic diols. Most preferred of the other chain extenders are 1,4-butanediol, and 1,6-hexanediol.

The polyahl which is employed as the optional soft segment of the polyurethane includes any organic compound having at least two active hydrogen moieties wherein the compound has a molecular weight of at least 200 and a hydroxy equivalent weight of at least 50, preferably at least 100. Preferably, the polyahl is a polymer having at least two active hydrogen moieties, a molecular weight of at least 400 and a total of at least 5 monomeric units derived from propylene oxide and/or ethylene oxide For the purposes of this invention, an active hydrogen moiety refers to a moiety containing a hydrogen atom which, because of its position in the molecule, displays significant activity according to the Zerewitinoff test described by Woller in the *Journal of The American Chemical Society,* Vol. 49, p. 3181 (1927) . Illustrative of such active hydrogen moieties are —COOH, —OH, —NH$_2$, =NH, —CONH$_2$, —SH and —CONH—. Typical polyahls are NCO-reactive and include polyols, polyamines including amine-terminated polyethers, polyamides, polymercaptans, hydroxy-terminated polyesters, polyacids and the like, particularly as exemplified in U.S. Pat. Nos. 4,394,491 and 4,822,827.In general the polyahl should not have a functionality greater than 4 in order to enable the polyurethane to retain its thermal processability For the polyahls having a functionality of 3 or 4, the amount of polyahl employed should be relatively small, e.g., less than about 10 weight percent based on the polyahl, to avoid making a thermoset polyurethane.

Of the foregoing polyahls, the polyols are preferred. Examples of such polyols are the polyether polyols, the polyester polyols, hydroxy functional acrylic polymers, hydroxyl-containing epoxy resins, and other polyols described in U.S. Pat. No. 4,731,416, which is incorporated by reference in its entirety.

Polyether polyols which are most advantageously employed as the polyahl in the practice of this invention are the polyalkylene polyether polyols including the polymerization products of alkylene oxides and other oxiranes in the presence of an initiator compound such as water or polyhydric alcohols having from two to eight hydroxyl groups. Exemplary such alcohols include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, a-methyl glucoside, pentaerythritol, erythritol, pentatols and hexatols. Also included within the term "polyhydric alcohol" are sugars such as glucose, sucrose, fructose, sorbitol and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide glycidyl ethers such as t-butyl glycidyl ether and phenyl glycidyl ether and random or block copolymers of two or more of these oxiranes. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. Polyether polyols which are most preferred include the alkylene oxide addition products of water, trimethylolpropane, glycerine, pentaerythritol, propylene glycol and blends thereof having hydroxyl equivalent weights of from about 200 to about 10,000, especially from about 350 to about 3000.

In general, the overall proportions of the components of the polyurethane are such that the active hydrogen containing components, i.e., the chain extender(s) and the optional polyahl, balance the isocyanate component(s) so that stoichiometric equivalency of the reactants is maintained. However, for various reasons, it is not always possible or desirable to meet the 1:1 equivalency. Thus, the proportions are such that the overall ratio of isocyanate groups to active hydrogen groups is in the range from about 0.90:1 to about 1.15:1, and preferably, from about 0.95:1 to about 1.10:1. In the active hydrogen chain extender component, the cycloalkanediol and/or cycloalkane dialkanol portion is sufficient to provide the polyurethane with the desired Tg which portion is preferably in the range from about 10 to about 100, more preferably from about 15 to about 100, most preferably 80–100, weight percent of total chain extender with the remainder being a conventional difunctional chain extender as previously discussed. The polyahl, which is optionally employed in the polyurethane, is employed in an amount which will not lower the tensile modulus of the polyurethane to values below 150,000 psi (1035 MPa) as measured in accordance with ASTM Test Method D-638. Preferably such amount is less than about 25 weight percent of the total weight of components used to make the polyurethane, with amounts less than 10 weight percent being more preferred.

The polyurethane is employed in the blend in an amount sufficient to increase the tensile strength of the blend by at least 5 percent compared to the polyester only. Preferred blends comprise from about 75 to about 25, more preferably from about 60 to about 40, and most preferably about 50, weight percent of the polyester and from about 10 to about 90, more preferably from about 25 to about 75, more preferably from about 40 to about 60, an most preferably about 50, weight percent of the rigid polyurethane. In addition to the foregoing critical components, this blend optionally contains other components such as antioxidants, thermal stabilizers, UV stabilizers, lubricants, and the like which do not significantly impair the transparency, hardness and thermal resistance of the blends.

The blends can be prepared by adding the polyester to the feed part or the vent port of an extruder during reaction extrusion polymerization of the polyurethane resin. See, for example, the conditions described in U.S. Pat. No. 4,822,827. Under such conditions, the reaction of isocyanate moieties and active hydrogen moieties can be carried out in absence of a urethane-type catalyst. However, when fast reaction time is desirable, e.g., less than one minute, the urethane reaction is carried out in the presence of a urethane-type catalyst which is effective to catalyze the reaction of the active hydrogen moieties with the isocyanate moieties. The urethane catalyst is used in an amount comparable to that used in conventional urethane-type reactions, preferably in an amount from about 0,001 to about 5 weight percent based on the weight of the reaction mixture. Any suitable urethane catalyst may be used including tertiary amines, such as, for example, triethylenediamine, N-methyl morphcline, N-ethyl morphcline, diethyl ethanolamine, morphcline, 1-methyl-4-dimethylaminoethyl piperszinc, 3-methoxy-N-dimethylpropylamine, N,N-dimethyl-N',N'-methyl isopropyl propylenediamine, N,N-diethyl-3-diethylaminopropylamine, dimethylbenzylamine and other catalysts disclosed in U.S. Pat. No. 4,731,416. Preferred catalysts are the tin catalysts such as the liquid organotin carboxylates, e.g., those catalysts prepared by the reaction on one mole of dialkyltin oxide with one mole of a carboxylic acid as disclosed in more detail in U.S. Pat. No. 3,661,887. When the polyurethane is prepared by a reactive extrusion method using a continuous twin screw reactor extruder such as described in U.S. Pat. No. 3,642,964, the polyester resin may be added in any conventional manner, e.g., initially with the urethane-forming reactants or at a later stage during polymer formation.

Alternatively, the polyester can be admixed, preferably in comminuted form such as powder, pellets and the like with the finished polyurethane also in a similarly comminuted form. The resulting physical mixture is then homogenized and/or fluxed by conventional melt blending means such as by extrusion, milling, Banbury mixing, and the like.

The blends are prepared in non-cellular form. The polyurethane compositions can be converted to non-cellular shapes by standard molding techniques known in the art of molding thermoplastic or thermoset polyurethanes. Such techniques include reaction injection molding and cast molding at the time the polyurethane is prepared and injection molding, extrusion, compression molding, blow molding calendering, thermoforming and the like in the case of fabricating the finished polymer composition. The marked resistance of the polyurethane component employed in the compositions of this invention to deformation or decomposition upon exposure to temperatures involved in melt processing greatly facilitates the fabrication of articles from the compositions.

ILLUSTRATIVE EMBODIMENTS

The following examples are given to illustrate the invention and should not be interpreted as limiting it in any way. Unless stated otherwise, all parts and percentages are given by weight.

EXAMPLE 1

A series of blends comprising varying amounts of poly(ethylene terephthalate) copolyester and a rigid thermoplastic polyurethane (RTPU) having a Tg of 237° F. (114° C.) (commercially available under the trademark ISOPLAST* 301 from The Dow Chemical Company) is prepared. The weight proportion of the polyurethane component for each blend is shown in Table I. The components, in form of pellets, are tumble blended and then fed to an Arburg 220E (2 oz.) injection molding machine having a barrel temperature profile of 230° C., a nozzle temperature of 250° C. and a mold temperature of 60° C. and operating at a screw speed of 150 revolutions per minute (rpm), an injection speed setting of 2, an injection pressure of 1000 psi (7 MPa) and an injection time and cooling time of 5 and 20 seconds, respectively. Alternate similar results could be obtained by adding a pellet/pellet mixture of the polyester and polyurethane directly to the injection molding apparatus without previous compounding. The samples 1, 2 and 3 are tested for physical properties and transparency and the results of such tests are reported in the following Table I.

COMPARATIVE EXAMPLES A AND B

For purposes of comparison, control samples are prepared using the polyurethane or the polyester employed in Examples 1-3 as the sole polymeric component of the sample. These samples (Samples Nos. A and B) are also tested and the results of these tests are also reported in the Table I.

As evidenced by the data shown in Table I, the blend compositions of the present invention, Samples Nos. 1, 2 and 3, exhibit improved tensile strength without significantly sacrificing the transparency as compared to the comparative blends having polyester or polyurethane as the sole component (Samples A and B).

What is claimed is:

1. A transparent, thermally processable polyester/polyurethane blend exhibiting improved tensile strength, said blend comprising (1) a thermoplastic, aromatic polyester and (2) a thermally processable, rigid polyurethane in an amount sufficient to measurably increase the tensile strength of the polyester without significantly reducing the transparency of the polyester.

2. A polyester/polyurethane blend of claim 1 wherein the polyurethane component constitutes of from about 10 to about 90 weight percent of the blend.

3. A polyester/polyurethane blend of claim 1 wherein the polyurethane component constitutes of from about 25 to about 75 weight percent of the blend.

4. A polyester/polyurethane blend of claim 1 wherein the polyurethane component constitutes of from about 40 to about 60 weight percent of the blend.

5. A polyester/polyurethane blend of claim 1 wherein the polyurethane component constitutes about 50 weight percent of the blend.

6. A polyester/polyurethane blend of claim 1 wherein the polyester component is selected from the group consisting of poly(ethylene terephthalate) and poly(1,4-butylene terephthalate) polyesters and copolyesters.

7. A polyester/polyurethane blend of claim 1 wherein the polyester component is poly(ethylene terephthalate) polyesters and copolyesters.

* * * * *

TABLE I

AROMATIC POLYESTER/TPU BLENDS

| Sample No. | % RTPU | Tensile Strength[1] @ Yield, psi (MPa) | Tensile Strength[1] @ Break psi (MPa) | Tensile Modulus[1], psi (MPa) | Elongation[2] (%) @ Yield (@ Break) | Transparency[2] |
|---|---|---|---|---|---|---|
| A* | 0 | 6770 (46.68) | 3800 (26.20) | 250 (1.72) | 3.9 (190) | 85.9 |
| 1 | 25 | 7130 (49.16) | 4200 (28.96) | 250 (1.72) | 4.2 (270) | 84.3 |
| 2 | 50 | 7900 (54.47) | 6300 (43.44) | 280 (1.93) | 5.0 (180) | 85.9 |
| 3 | 75 | 8200 (56.54) | 8600 (59.29) | 290 (1.990 | 5.5 (180) | 87.6 |
| B* | 100 | 9000 (62.05) | 8000 (55.16) | 280 (1.93) | 5.7 (160) | 90.3 |

*Not an example of the present invention
[1]Tensile Strength, Tensile Modulus and Elongation as determined by ASTM D-638
[2]Transparency as determined by ASTM-D 1003